(12) United States Patent
Lüders et al.

(10) Patent No.: US 8,204,669 B2
(45) Date of Patent: Jun. 19, 2012

(54) METHOD AND DEVICE FOR REGULATING THE DRIVING DYNAMICS OF A VEHICLE

(75) Inventors: Ulrich Lüders, Wiesbaden (DE); Rainer Oehler, Darmstadt (DE); Thomas Raste, Oberursel (DE); Hubertus Raitz von Frentz, Kronberg (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 857 days.

(21) Appl. No.: 10/555,902

(22) PCT Filed: May 4, 2004

(86) PCT No.: PCT/EP2004/050696
§ 371 (c)(1),
(2), (4) Date: Oct. 11, 2007

(87) PCT Pub. No.: WO2004/098939
PCT Pub. Date: Nov. 18, 2004

(65) Prior Publication Data
US 2009/0228181 A1  Sep. 10, 2009

(30) Foreign Application Priority Data

May 8, 2003  (DE) .................................. 103 20 804

(51) Int. Cl.
*B60T 7/12*   (2006.01)
*G05D 1/00*   (2006.01)
*G06F 7/00*   (2006.01)
*G06F 17/00*  (2006.01)

(52) U.S. Cl. ............... 701/90; 701/67; 701/82; 701/87; 701/88; 701/91; 180/197; 192/31

(58) Field of Classification Search .............. 701/67–69, 701/70–92
See application file for complete search history.

(56) References Cited

U.S. PATENT DOCUMENTS 5,576,959 A * 11/1996 Hrovat et al. ................... 701/70
5,911,291 A *  6/1999 Suetake et al. ................. 192/35
(Continued)

FOREIGN PATENT DOCUMENTS
DE         19721299         12/1997
(Continued)

*Primary Examiner* — Jack W Keith
*Assistant Examiner* — Rami Khatib
(74) *Attorney, Agent, or Firm* — Brinks Hofer Gilson Lione

(57) ABSTRACT

The present device relates to a method for regulating the driving dynamics of a vehicle, in which at least one wheel of the vehicle is acted upon by a torque on the basis of control of a clutch transmitting a torque to the wheel and/or on the basis of control of a differential distributing torque to the wheel and at least to one other wheel. The method is characterized in that a value of the torque is determined as a function of a first and a second value of a yaw moment. The first value of the yaw moment is in the form of a value of the yaw moment generating a setpoint value of a yaw rate on the basis of a vehicle reference model is determined on the basis of a vehicle reference model and the second value of the yaw moment is determined as a function of a system deviation between the setpoint value of the yaw rate and a detected actual value of the yaw rate and as a function of a system deviation between a setpoint value and an actual value of another driving state variable that is different from the yaw rate.

6 Claims, 11 Drawing Sheets

U.S. PATENT DOCUMENTS

| | | | | |
|---|---|---|---|---|
| 6,012,560 A | * | 1/2000 | Kuroda et al. | 192/35 |
| 6,041,904 A | * | 3/2000 | Kuroda et al. | 192/113.34 |
| 6,059,067 A | * | 5/2000 | Shibahata et al. | 180/338 |
| 6,095,276 A | * | 8/2000 | Kuroda et al. | 180/247 |
| 2002/0016661 A1 | * | 2/2002 | Frediani et al. | 701/69 |
| 2006/0157291 A1 | * | 7/2006 | Puiu et al. | 180/247 |

FOREIGN PATENT DOCUMENTS

| | | |
|---|---|---|
| DE | 19800327 | 7/1998 |
| EP | 1162101 | 12/2001 |
| WO | 0209965 | 2/2002 |

* cited by examiner

METHOD AND DEVICE FOR REGULATING THE DRIVING DYNAMICS OF A VEHICLE

BACKGROUND OF THE INVENTION

The invention relates to a method for regulating the driving dynamics of a vehicle, wherein a specific torque acts on at least one wheel of the vehicle based on control of a clutch transmitting torque to the wheel and/or as a result of control of a differential distributing torque to said wheel plus at least one additional wheel.

The present invention also relates to a device for regulating the driving dynamics of a vehicle, comprising at least one actuator for controlling a clutch that transmits torque to a wheel of the vehicle and/or at least one actuator for controlling a differential that distributes torque to the wheels of the vehicle.

It is known from the state of the art that electronically controllable elements can be incorporated into the drive train of a motor vehicle to distribute the driving power among the individual wheels in a targeted manner. Known options for controlling a torque transmitted to a wheel range from controlling lockable differentials on a driven axle of the vehicle to an individual torque distribution to each wheel in the case of four-wheel drive vehicles.

A generic method and a generic device are derived from Unexamined German Patent DE 198 00 327 A1, for example, which relates to a driving power control system in a four-wheel drive vehicle in which the maximum torque transmitted to a right and left wheel by a right and left clutch is set to be lower with an increase in vehicle speed. Furthermore, a rear differential is capable of generating a difference between engagement forces of the right and left clutches to control the steering characteristic of the vehicle and in particular to eliminate any tendency of the vehicle to oversteer or understeer. This is recognized on the basis of a comparison of a calculated reference yaw rate with a detected instantaneous yaw rate of the vehicle.

International Patent Application WO 02/09965 A1 discloses another generic method and another generic device with which rotational speeds of individual wheels are adapted to driving maneuvers initiated by the driver, said maneuvers being recognized on the basis of driving state parameters detected by sensors. Differentials are used to control the rotational speeds.

Through measures intervening in the drive train, such as those performed with the aforementioned methods and devices, for example, the vehicle following performance is greatly improved in many driving situations. In particular, a reduction in a tendency to understeer, which can be achieved through a targeted distribution of torque among the individual wheels, leads to more direct vehicle responses and thus to increased safety, in particular in swerving maneuvers to avoid an object and to an increase in the driving pleasure perceived by the driver.

However, the known methods have the disadvantage that physical limits of a stable driving performance are taken into account only inadequately or not at all and the regulating intervention measures provide little or no support for the driver in the limit range in terms of driving dynamics. An ESP system that intervenes in the driving dynamics regulation in safety-critical driving states for implementation of an electronic stability program (ESP) is often perceived by the driver as unexpected and uncomfortable.

SUMMARY OF THE INVENTION

Therefore, the object of the present invention is to ensure safe and reliable support of the driver of a vehicle on the basis of intervention in the drive train and thereby take into account the physical limits in particular.

This object is achieved according to this invention by a method for regulating driving dynamics of a motor vehicle.

This object is also achieved according to this invention by a device for regulating driving dynamics of a vehicle.

According to this invention in particular, a method for regulating the driving dynamics of a vehicle is provided, whereby at least one wheel of the vehicle is acted upon by a torque on the basis of control of a clutch transmitting the torque to the wheel and/or on the basis of control of a differential distributing torque to the wheel and at least one other wheel so that a value for the torque is determined as a function of a first value of a yawing moment and a second value of a yawing moment, whereby the first value of the yawing moment is determined in the form of a setpoint value of a yaw rate generating value of the yawing moment determined on the basis of a vehicle reference model and the second value of the yawing moment is determined as a function of a system deviation between the setpoint value of the yaw rate and a detected actual value of the yaw rate and also as a function of a system deviation between a setpoint value and an actual value of another driving state variable which is different from the yaw rate.

This invention thus creates an advantageous method for applying a yawing moment that creates a setpoint yaw rate to a vehicle by intervention measures involving the drive train, performed in the form of control of at least one clutch and/or one differential.

This method is characterized in that regulating intervention measures are performed as a combination of a preliminary control and feedback so that a very rapid, reliable and safe regulating method can be implemented.

The method according to this invention thus increases the driving stability of a vehicle, especially in critical driving situations in the limit range in terms of driving dynamics to a great extent. It is thus differentiated from known methods which contribute to an increase in the agility of the vehicle but do not support the river adequately in critical driving situations.

The inventive intervention measures may supplement or replace the braking and engine intervention measures of an ESP system so that ESP regulating intervention measures must be performed far less frequently than would be the case without the inventive intervention measures. This significantly improves safety and driving comfort in the physical limit range.

The desired performance of the vehicle is taken into account particularly well through the vehicle reference model used as the basis for the preliminary control. The feedback makes is possible especially advantageously to perform a combined regulation of multiple driving state variables.

For the preliminary control, a yawing moment that creates a setpoint yaw rate is calculated in a vehicle reference model which is expediently an inverse vehicle model.

The setpoint yaw rate is preferably determined as a function to parameters set by the driver, e.g., the steering angle $\delta$ set by the driver on at least one steerable wheel of the vehicle and the vehicle speed set by the driver so that the setpoint yaw rate corresponds to the yaw rate desired by the driver.

A coefficient of friction of the substrate is preferably taken into account in the vehicle reference model. This makes it possible to perform a very secure and reliable driving dynamics regulation in particular in the driving dynamics limit range.

In a preferred embodiment of the present invention, detection of the coefficient of friction is therefore performed.

In the feedback in a preferred embodiment of the method, a system deviation of a tire slip angle and/or a longitudinal slippage of at least one wheel of the vehicle are taken into account in addition to the system deviation of the yaw rate of the vehicle.

This provides regulation of various important driving state variables, so the driving stability of the vehicle is further improved, especially in critical driving situations.

In another embodiment of the method, the regulating system is activated when a safety-critical driving situation is detected.

A critical driving situation is preferably recognized when a value of at least one driving state variable exceeds a preselected first threshold value.

The regulating intervention measure may be terminated when the critical driving situation has been overcome. Expediently, the fact that a critical driving situation is no longer occurring will then be recognized on the basis of the fact that the value of at least one driving state variable is below a second threshold value.

Safety-critical driving situations can be recognized in particular on the basis of a handling potential value which contains information about the lateral traction of a wheel yet to be built up starting from the instantaneous driving state.

The lateral traction on a wheel of the vehicle is generated as a result of a tire slip angle of the wheel. It increases initially with an increase in the tire slip angle up to a maximum value, then dropping again slightly with a further increase in the tire slip angle.

It is thus possible to determine a degree of utilization of the tire slip angle, which assumes a value of one for tire slip angles of a wheel that are smaller than the tire slip angle assigned to the maximum value of the lateral traction, and is defined the ratio between the present value of the tire slip angle and the value belonging to the maximum value of the lateral traction and which assumes a value of one for tire slip angles that are greater than the tire slip angle assigned to the maximum value of the lateral traction.

The handling potential is derived from the degree of utilization of the tire slip angle.

In addition to the method described here, the present invention thus also creates an advantageous device which is suitable for implementing this method.

The device for regulating the driving dynamics of a vehicle having at least one actuator for controlling a clutch that transmits torque to one wheel of the vehicle and/or at least one actuator for controlling a differential that distributes torque to wheels of the vehicle is characterized in particular in that it has a precontrol unit for determining a first yawing moment that generates a setpoint yaw rate, a regulating unit for determining a second yaw rate as a function of a system deviation between the setpoint yaw rate and an actual detected yaw rate and as a function of a system deviation between a setpoint and an actual value of another driving state variable that is different from the yaw rate, and a control unit for controlling the actuators as a function of a torque determined on the basis of the first and second yawing moments and an activation logic unit for activating the control unit as a function of a comparison between a system deviation in at least one driving state variable and a preselected threshold value.

Additional advantages and expedient refinements of the present invention are derived from the dependent claims and the following description of preferred exemplary embodiments on the basis of the figures.

BRIEF DESCRIPTION OF THE DRAWINGS

Of the figures.

DETAILED DESCRIPTION OF THE DRAWINGS

The present invention starts from a vehicle driven by an engine having two axles with two wheels each, for example. The wheels on one or both axles are connected to and drivable by the engine via suitable drive shafts and their connections. In the case of two-wheel drive vehicles, the wheels on both the rear and front axles may be driven.

To perform the inventive method, controllable elements are introduced into the drive train of the vehicle and are controlled, preferably electronically. These elements may be, for example, electrohydraulic or electromagnetic clutches or electrically lockable differentials. However, these are also typically controlled with the help of clutches, so that all the elements intervening in the drive train may hereinafter be referred to as clutches.

The clutches should be operable even during a skid, so the torque to be transmitted by them can be controlled. Suitable clutches include Haldex clutches, for example, or simple dry clutches.

According to the present invention, by controlling the torque transmitted by the clutches, a yawing moment $\vec{T}_{req,clutch}$ which causes the yaw rate $\dot{\psi}$ of the vehicle to approximate a preselected setpoint yaw rate is generated. In particular, the design of the drive train used in the given vehicle must be taken into account.

Figure 1C:
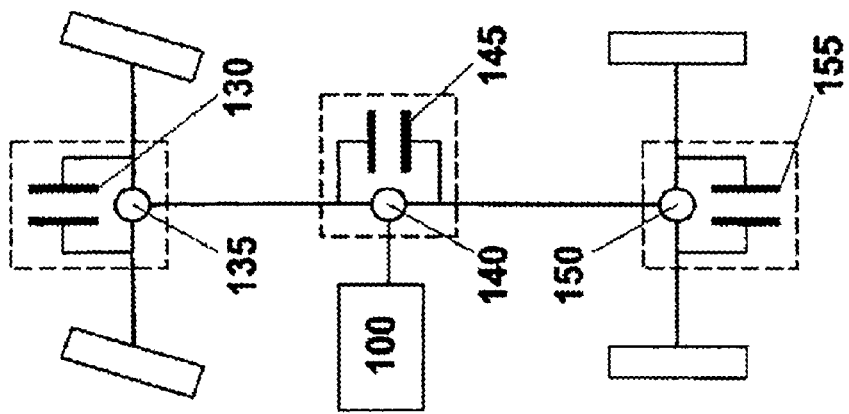
FIG. 1c shows yet another embodiment of a drive train of a four-wheel vehicle.
Figure 1B:
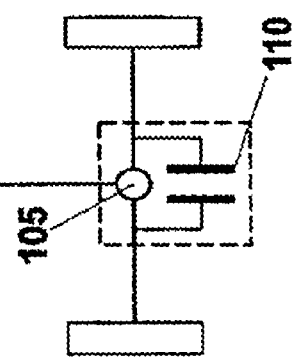
FIG. 1b shows another embodiment of a drive train of a four-wheel vehicle.
Figure 1A:
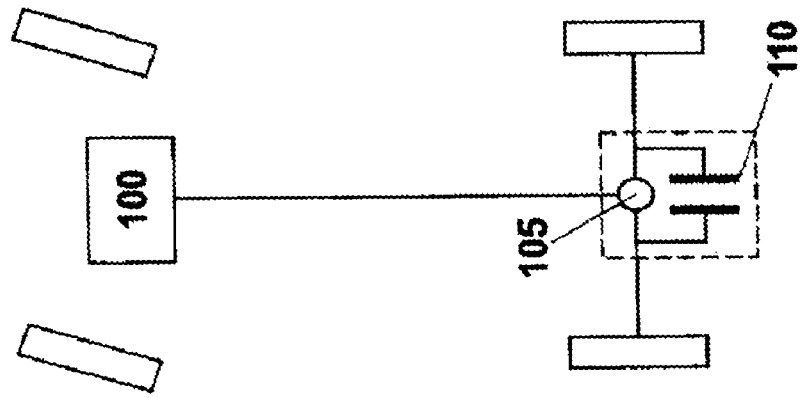
FIG. 1a shows an embodiment of a drive train of a four-wheel vehicle.

Various embodiments of the drive train for a two-axle four-wheel vehicle are illustrated in FIGS. 1a, 1b and 1c.

In particular, FIG. 1a shows a drive train having a rear axle driven by an engine 100. A right and left part of the rear axle are joined together by a differential 105 which may be blocked with the help of a clutch 110.

In the embodiment of the drive train illustrated in FIG. 1b, both axles of the vehicle are driven by the engine 100, with differences in the rotational speed of the front wheels being compensated by a differential 115 that cannot be controlled. The output shafts on the rear axle of the vehicle connected to the right and left rear wheels are connected by a right clutch 150 and a left clutch 160 to a cardan shaft that transmits the driving power of the engine.

In another embodiment illustrated in FIG. 1c, the drive train may have a driven front axle with a differential 135 lockable by a clutch 130, a driven rear axle with a differential lockable by a clutch 155 and a central differential 140 which is lockable by a clutch 145 and achieves a balance between the driving torque on the front and rear axles.

The following table shows how the clutches in the embodiments of the drive train illustrated in the figures are to be controlled while the vehicle is turning left in order to apply a certain yawing moment to the vehicle. In the case of control, one factor to be taken into account is whether the vehicle is accelerated by the driver applying pressure to an accelerator pedal (accelerator pedal »0) or if the speed of the vehicle is constant (accelerator pedal=0). In the table, the plus or minus sign of a z component $\vec{T}_{req,clutch}$ of the yawing moment $\vec{T}_{req,clutch}$ to be established is given, where the z direction indicates the vertical direction of the vehicle. The terms "yawing moment" and "z component of a yawing moment" are used as synonyms below because in general only the z component of a yawing moment of a vehicle is different from zero.

The control options include metered preselection of the torque (x) transmitted by a clutch or disengaging an engaged clutch (0). Parentheses around x indicate that a regulated torque specification is in effect until a braking intervention is detected and then the clutch is disengaged.

| | | Drive train in FIGS. | | | | | |
|---|---|---|---|---|---|---|---|
| | | 1a | 1b | | 1c | | |
| | | | Clutch | | | | |
| | | 110 | 120 | 125 | 130 | 145 | 155 |
| Driver [sic; accelerator] pedal = 0 | $\vec{T}_{req,\,clutch} > 0$ | — | — | — | — | — | — |
| | $\vec{T}_{req,\,clutch} \neq 0$ | x | 0 | x | (x) | 0 | x |
| Driver [sic; accelerator] pedal >> 0 | $\vec{T}_{req,\,clutch} > 0$ | 0 | 0 | x | 0 | x | 0 |
| | $\vec{T}_{req,\,clutch} \neq 0$ | x | x | 0 | (x) | 0 | x |

The symbol "—" in the table indicates that the required yawing moment cannot be generated by control of one or more clutches.

From the standpoint of driving dynamics regulating measures, the vehicle must be acted upon by a positive or negative yawing moment $\vec{T}_{req,clutch}$ when turning left to combat oversteering or understeering.

In addition to the possibility of creating a yawing moment through measures intervening in the drive train, there is the known possibility of utilizing brake intervention measures and intervention into the engine management to generate a yawing moment.

The control by known EPS systems typically used in vehicles today is based on this principle.

It is assumed here that the vehicle in question has an ESP regulator.

Figure 2:
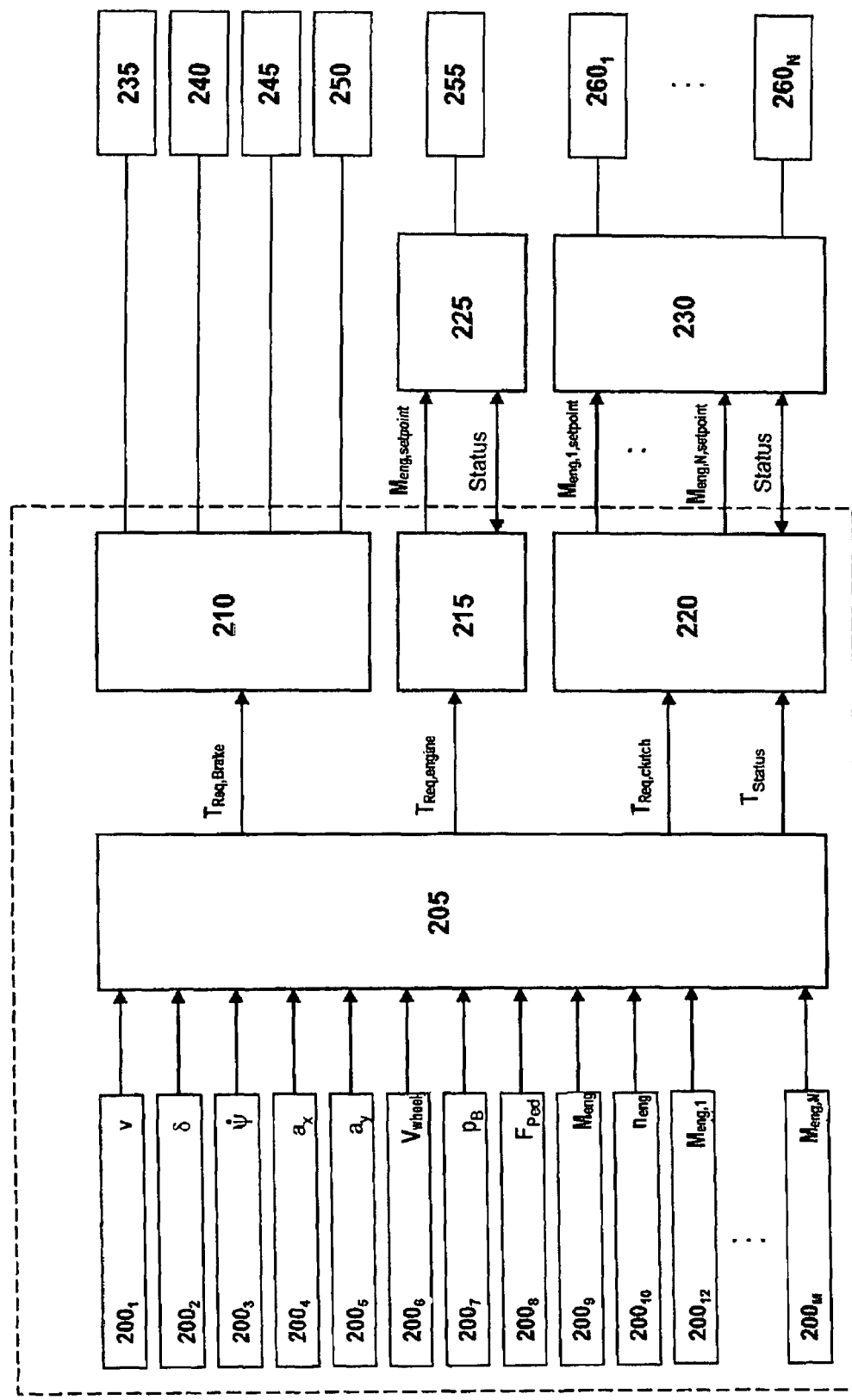
FIG. 2 shows an illustration of driving dynamics regulation on the basis of a block diagram having a vehicle regulator and other components.

FIG. 2 shows a block diagram of this regulating system.

It is assumed here in particular that the ESP regulator is a vehicle regulator 205 which calculates a yawing moment for correction of the yaw rate $\dot{\psi}$ as a function of a deviation between a detected actual value of the yaw rate $\dot{\psi}$ and a preselected setpoint value $\dot{\psi}_{ref}$, the yaw rate being composed of a component $\vec{T}_{req,brake}$ to be established based on a braking intervention measure, a component $\vec{T}_{req,engine}$ to be established based on engine intervention measures and a component $\vec{T}_{req,clutch}$ to be set by intervention measures in the drive train.

These components are transmitted to a brake regulator 210, an engine regulator 215 and a drive train regulator 230.

On the basis of the yawing moment $\vec{T}_{req,brake}$ transmitted to the brake regulator 210, it calculates brake pressures for the wheel brake 235 on the left front wheel, the wheel brake 240 on the right front wheel, the wheel brake 245 on the left rear wheel and the wheel brake 250 on the right rear wheel and adjusts these brake pressures by means of a suitable actuator.

The engine regulator 215 calculates on the basis of the yawing moment $\vec{T}_{req,engine}$ transmitted to it, a setpoint torque $M_{eng,setpoint}$ for the engine 255 of the vehicle which is transmitted to an engine control unit 225 which performs the corresponding intervention measures into the engine 255 by means of suitable actuators and also monitors them. The engine status is reported back to the engine regulator 215 to be taken into account in the calculation of $M_{eng,setpoint}$.

On the basis of the yawing moment $\vec{T}_{req,clutch}$ transmitted to the drive train regulator 220, it calculates torques $M_{clutch,1,setpoint}$ through $M_{clutch,N,setpoint}$ that are to be transmitted by the clutches $260_1$ through $260_N$. These torques are transmitted to a drive train control unit 230 which controls the clutches by means of suitable actuators according to the preselected torques $M_{clutch,1,setpoint}$ through $M_{clutch,N,setpoint}$. The setpoint degree of blocking or the setpoint stiffness of a clutch and/or differential is calculated here on the basis of the torques $M_{clutch,1,setpoint}$ through $M_{clutch,N,setpoint}$. These values may of course also be calculated by the drive train regulator 220 or the vehicle regulator 205. However, it is assumed here that the interface between units 205 and 220 and in particular the interface between units 220 and 230 are designed so that they are based on an exchange of torques.

Likewise, status information about the status of the control unit and especially about the clutches and the actuators controlling the clutches is transmitted via the interfaces between units 205, 220 and 230.

According to the figure, the input variables of the vehicle regulator 205 include a vehicle longitudinal speed v, a steering angle δ on steerable wheels of the vehicle, the yaw rate $\dot{\psi}$, a longitudinal acceleration $a_x$ of the vehicle, a transverse acceleration $a_y$ of the vehicle, wheel speeds $v_{wheel}$ of the individual wheels of the vehicle, brake pressures $P_B$ of the individual wheel brakes 235, 240, 245 and 250 of the vehicle, the accelerator pedal position, i.e., pedal force $F_{ped}$ applied by the driver, the torque $M_{engine}$ of the engine 255 of the vehicle, a rotational speed $n_{engine}$ of the engine 255 and torques $M_{clutch,1}$ through $M_{clutch,N}$ transmitted by clutches $260_1$ through $260_N$.

The instantaneous actual values of these parameters are detected by suitable sensors $200_1$ through $200_M$.

The inventive drive train regulation and the units used for this are described in greater detail below. This is done on the example of regulation on the basis of the drive train illustrated in FIG. 1b.

To implement the inventive method, the vehicle regulator 205 uses various detected variables or variables derived from detected variables. These include a float angle β of the vehicle, a coefficient of friction μ of the instantaneous substrate, a tire slip angle α of the rear wheels, a longitudinal slippage λ of a front wheel on the inside of the turn, a reference tire slip angle $α_{ref}$, a reference longitudinal slippage $α_{ref}$, the reference yaw rate $\dot{ψ}_{ref}$, a system deviation Δα of the tire slip angle α, a system deviation Δλ of the longitudinal slippage λ, a system deviation $Δ\dot{ψ}$, a handling potential $P_y$, a precontrol component $T_{precontrol}$ of the yawing moment $T_{req,clutch}$, a feedback component $T_{regulator}$ of the yawing moment $T_{req,clutch}$, a signal $T_{precontrol,on/off}$, a signal $T_{regulator}$, on/off and a status signal $T_{status}$.

Figure 3:
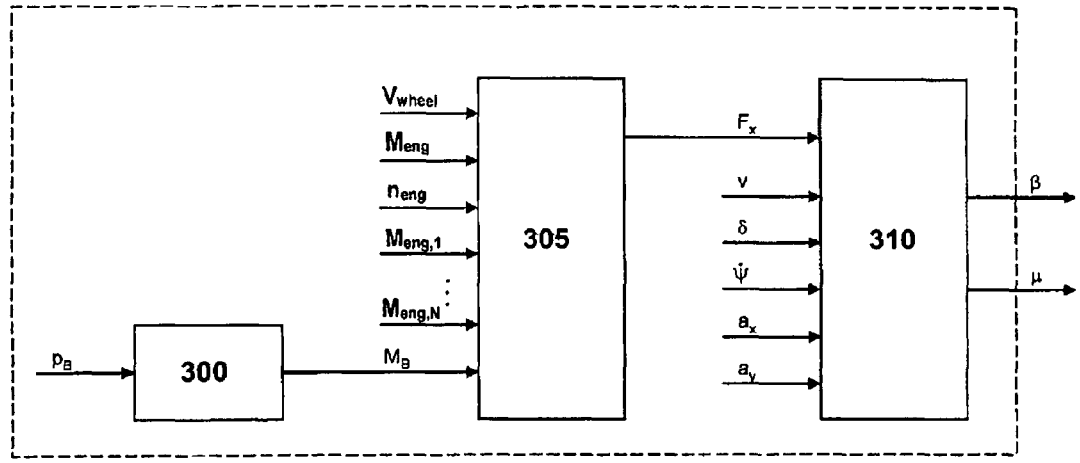
FIG. 3 shows a block diagram of a vehicle regulator component for determining the float angle and the coefficient of friction.
Figure 4:
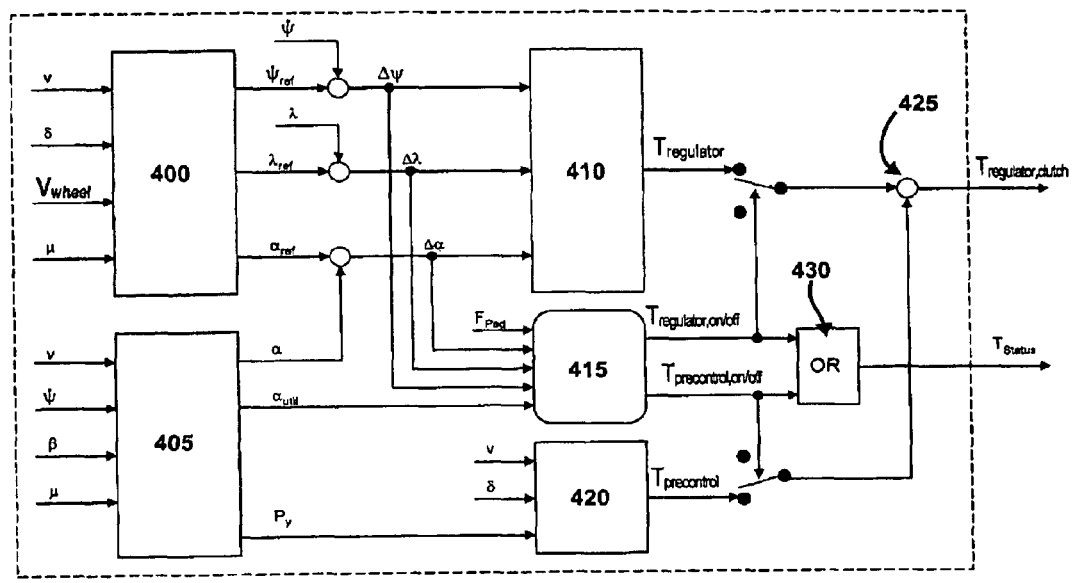
FIG. 4 shows a block diagram of a vehicle regulator component for drive train regulation.

FIG. 3 shows a block diagram of a component of the vehicle regulator 205 for determining the float angle β and the coefficient of friction μ.

This contains a unit 310 for calculating the float angle and the coefficient of friction μ as a function of a longitudinal force $F_x$ acting on the vehicle, vehicle longitudinal velocity v, steering angle δ, yaw rate of $\dot{ψ}$, longitudinal acceleration $a_x$ and transverse acceleration $a_y$. The longitudinal force $F_x$ acting on the vehicle is determined by unit 305 as a function of the individual wheel speeds $v_{wheel}$, the engine torque $M_{engine}$, the engine rotational speed $n_{engine}$, the clutch torque $M_{clutch,1}$ through $M_{clutch,N}$ and a braking torque $M_B$ which is calculated by unit 300 from the brake pressures $P_B$ on the wheel brakes.

The float angle β is preferably determined by an estimation method such as that described in International Patent Application WO 01/081139 A1 by the present applicant under the title "Method of Online Determination of Driving Dynamics Variables for a Motor Vehicle," to which reference is made in this context.

The coefficient of friction μ is preferably determined by an estimation method as described in Unexamined German Patent DE 102 08 815 A1 under the title "Method of Determining a Maximum Coefficient of Friction," to which reference is herewith made in conjunction with the determination of the coefficient of friction.

The longitudinal slippage λ of the front wheel on the inside of the curve is preferably calculated as the difference between the wheel speed $v_{wheel,K}$ of the front wheel on the inside of the curve and the longitudinal velocity v of the vehicle:

$$λ = v_{wheel} - v$$

On the basis of the steering angle δ, the yaw rate $\dot{ψ}$ or the tire slip angle α x, it is possible to determine which of the front wheels is on the inside of the turn.

Alternatively, it is also possible to determine the longitudinal slippage as a differential velocity based on the wheel speed $v_{wheel}$ according to the formula $$λ = \frac{v_{wheel} - v}{v_{wheel}}.$$

However, the first definition is used in the following discussion.

To calculate the setpoint values, unit 400 uses a vehicle reference model which represents a "virtual vehicle" with which a desired performance of the vehicle can be described. In particular, the vehicle reference model makes it possible to calculate the setpoint yaw rate $\dot{ψ}_{ref}$ as a function of the steering angle δ) preselected by the driver and the longitudinal speed v of the vehicle which is also preselected by the driver.

In one exemplary embodiment of this invention 400, the known stationary one-track model of the vehicle is used as the basis for determining $\dot{ψ}_{ref}$. It then holds that $$\dot{ψ} = \frac{v}{1 + EG_{4WD} \cdot v^2} \cdot δ$$

where l denotes the wheel base of the vehicle.

The variable $EG_{4WD}$ is the desired roll-steer gradient of the vehicle which can be set on the basis of the inventive method through intervention in the drive train. It is to be differentiated from roll-steer gradients, e.g., of the vehicle due to the design of the vehicle, the value of this roll-steer gradient being derivable with no change from vehicle parameters.

Since the desired performance of the vehicle is to be described by the vehicle reference model, the desired roll-steer gradient, $EG_{4WD}$ is to be used in the model. In a preferred embodiment of this invention, $EG_{4WD}$ assumes a value of zero so that a neutral driving performance of the vehicle is achieved.

In general, the roll-steer gradient $EG_{4WD}$ can be specified as a fixed parameter or as a characteristic curve. By preselecting a suitable characteristic line, a steady-state yaw gain can be adjusted advantageously, e.g., $$\left(\frac{\dot{ψ}}{δ}\right)_{stat} = const.$$

Of course the intended performance of the vehicle can also be imaged and adjusted dynamically by using a non-steady-state single-track model, as is also done in ESP systems according to the state of the art and is preferred here.

The setpoint values $λ_{ref}$ and $α_{ref}$ for the longitudinal slippage λ and the tire slip angle α may be preselected, e.g., in the form of constant threshold values $λ_{thr}$ and $α_{thr}$:

$$λ_{ref} = λ_{thr}$$

$$α_{ref} = α_{thr}$$

The threshold value $λ_{thr}$ assumes values between 5 km/h and 30 km/h and preferably assumes a value of 15 km/h. The threshold value $α_{thr}$ assumes values between 0° and 10°.

The vehicle-handling potential $P_y$ is calculated by the unit 405. This indicates essentially by which amount the lateral traction $F_y$ in the instantaneous driving state of the vehicle can be increased until reaching its maximum level $F_{y,max}$.

With the drive train regulation in question here in which intervention measures are taken on the rear axle of the vehicle, the handling potential $P_y$ on the rear axle is of particular interest.

Figure 5:
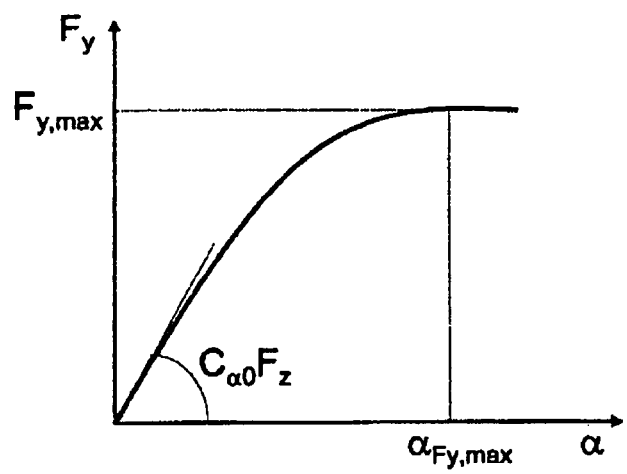
FIG. 5 shows a diagram with a characteristic curve of lateral traction as a function of tire slip angle.

A typical course of the lateral guidance-tire slip angle characteristic line is illustrated in a lateral traction-tire slip angle diagram in FIG. 5. This diagram shows that the lateral traction $F_y$ increases at first with an increase in the tire slip angle α up to a maximum value $F_{y,max}$ which depends on the coefficient of friction. The tire slip angle assigned to the maximum $F_{y,max}$ is referred to here as $α_{Fy,max}$. The lateral traction decreases again slightly for tire slip angles $α > α_{Fy,max}$.

The tire slip angle α of the rear wheels of the vehicle is determined by unit 405 on the basis of the equation $$α = -β + \frac{l_H}{v} \cdot \dot{ψ}$$

where $l_H$ is the distance between a center of gravity of the vehicle and a point of intersection between the vehicle longitudinal axis and the rear axle.

To determine the handling potential or lateral traction potential $P_y$, the tire slip angle $\alpha_{Fy,\,max}$ is determined. The lateral force-tire slip angle characteristic line is parameterized in the following manner:

$$F_y = C_{a0} \cdot F_z \cdot \alpha - \frac{C_{a0}^2 \cdot F_z^2}{4 \cdot \mu \cdot F_z} \cdot \alpha^2 \quad (1)$$

This expression is an approximation which is valid for tire slip angles where $\alpha \leq \alpha_{Fy,\,max}$. $C_{\alpha 0}$ denotes a so-called initial slope parameter, $F_z$ denotes the tire contact force or normal force which varies in particular with a rolling motion of the vehicle.

On the basis of the expression for $F_y$ according to equation (1), this yields:

$$\alpha_{Fy,max} = \frac{2 \cdot \mu}{C_{a0}}$$

The value $\alpha_{Fy,\,max}$ is thus independent of the tire contact force $F_z$, which need not be determined here.

In a preferred embodiment of the inventive method, the lateral traction potential $P_y$ is determined as the complement on one of an instantaneous degree of utilization $\alpha_{util}$ of the tire slip angle:

$$P_y = 1 - \alpha_{util}$$

The degree of utilization $\alpha_{util}$ of the tire slip angle is defined and calculated as follows:

$$\alpha_{util} = \begin{cases} \frac{C_{a0}}{2 \cdot \mu} \cdot |\alpha|, & |\alpha| < \alpha_{Fy,max} \\ 1, & |\alpha| \geq \alpha_{Fy,max} \end{cases}$$

A yawing moment $T_{precontrol}$ is determined by unit 420 and corresponds to the yawing moment to be generated by measures intervening in the drive train.

This is determined on the basis of a vehicle model which is preferably a so-called inverse model in which the yawing moment generating the setpoint yaw rate $\dot{\psi}_{ref}$ is determined to be the output variable as a function of the setpoint yaw rate $\dot{\psi}_{ref}$. The transmission performance of the unit 420 thus corresponds to the inverse transmission ratio of a control segment for regulating driving dynamics without a precontrol unit.

The starting point for determining the inverse vehicle model is the linear single-track model. The equation below follows from the balance of forces and torques in steady-state behavior:

$$m \cdot a_y = F_{yV} + F_{yH} \quad (2)$$

$$\Theta \cdot \frac{d^2 \psi}{dt^2} = 0 = F_{yV} \cdot 1_V + F_{yH} \cdot 1_H + M_{4WD}$$

where m is the mass of the vehicle, $l_v$ is a distance between center of gravity of the vehicle and a point of intersection between a longitudinal axis of the vehicle and the front axle, $F_{yV}$ is the lateral traction of the front wheels, $F_{yH}$ is the lateral traction of the rear wheels, 1 is the moment of inertia of the vehicle with respect to its vertical axis, and $d^2P/dt^2$ is a yaw acceleration of the vehicle. The quantity $M_{4WD}$ is the yawing moment generated by the regulating intervention measures.

Figure 6:
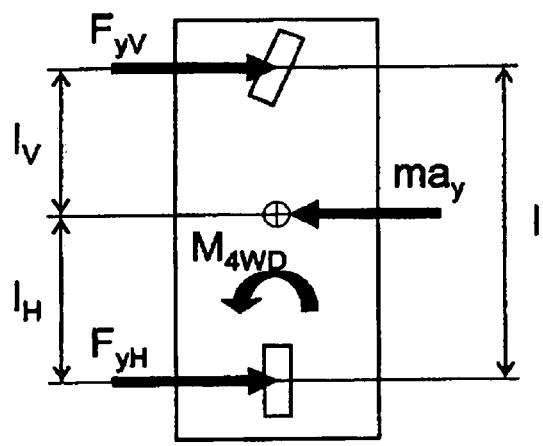
FIG. 6 shows a diagram of a single-track model having various parameters plotted in it.

FIG. 6 shows several of these parameters plotted in a diagram of a single-track model.

Rearranging the equation system in equation 2 and inserting the linear approximations $$F_{yV} = C_V \cdot \left(\delta - \beta - \frac{1_V}{v}\dot{\psi}\right) \text{ and } F_{yH} = C_H \cdot \left(-\beta + \frac{1_H}{v}\dot{\psi}\right) \quad (3)$$

for the lateral forces [sic; lateral traction] $F_{yV}$ and $F_{yH}$ with vehicle parameters $C_v$ and $C_H$—the so-called tire slip stiffness—and leads to the following equation system, using the relationship $l=l_v+l_H$:

$$C_V \cdot \left(\delta - \beta - \frac{1_V}{v}\dot{\psi}\right) \cdot 1 = m \cdot a_y \cdot 1_H - M_{4WD} \quad (4)$$

$$C_H \cdot \left(-\beta + \frac{1_H}{v}\dot{\psi}\right) \cdot 1 = m \cdot a_y \cdot 1_V + M_{4WD}$$

after eliminating $\beta$ and taking into account the equation $a_y = v \cdot \dot{\psi}$, the following expression can be obtained for the yaw rate $\dot{\psi}$:

$$\dot{\psi} = \frac{v}{1 + EG \cdot v^2} \cdot \left(\delta + \frac{C_V + C_H}{C_V \cdot C_H \cdot 1} \cdot M_{4WD}\right) \quad (5)$$

with $$EG := \frac{m}{1}\left(\frac{1_H}{C_V} - \frac{1_V}{C_H}\right)$$

EG is the roll-steer gradient of the vehicle, which is determined by the design.

The last term in equation (5) gives an expression for the yaw rate $\dot{\psi}$ which is obtained due to a steering angle $\delta$ set by the driver, a vehicle longitudinal velocity v set by the driver and a yawing moment $M_{4WD}$ created by the intervention measures in the drive train.

The yaw rate $\dot{\psi}_{ref}$ should be set through the regulating intervention measures.

To calculate $M_{4WD}$, the last expression for the yaw rate $\dot{\psi}$ and the expression given above for $\dot{\psi}_{ref}$ can be equated, so it then follows that:

$$M_{4WD} = \frac{(1 + EGv^2) \cdot C_V \cdot C_H \cdot 1}{C_V + C_H}\left(\frac{1}{1 + EG_{4WD} \cdot v^2} - \frac{1}{1 + EG \cdot v^2}\right) \cdot \delta \quad (6)$$

This expression represents the inverse vehicle model. However, because of the approximation used for the lateral traction $F_{yV}$ and $F_{yH}$, it is valid only if the tire slip angle $\alpha$ prevailing on the rear wheels is an angle at which the lateral traction increases approximately in proportion to the tire slip angle $\alpha$.

To be able to use the model even when the lateral traction $F_{yH}$ on the rear wheels enters saturation, it is expedient to replace the above approximation $$F_{yH} = C_H \cdot \alpha_H$$

where $$\alpha_H := -\beta + \frac{1_H}{v}\dot{\psi}$$

In equation 3 by the approximation $$F_{yH} = C_H \cdot P_y \cdot \alpha$$

where the tire slip angle α in this expression is to be interpreted in particular as the tire slip angle $\alpha_H$ of the rear wheels. Within the last expression for the yawing moment $M_{4WD}$ the transition from one approximation to the other approximation corresponds to a replacement of the following type:

$$C_H \rightarrow C_H \cdot P_y.$$

A neutral driving performance can preferably be set as the desired driving performance of the vehicle on the basis of the inventive method. $E_{4WD}=0$ must be inserted into the expression for calculating $M_{4WD}$ in equation (6).

This yields the following for a vehicle having neutral performance from the expression in equation (6) for the inverse vehicle model:

$$M_{4WD} = \frac{C_V \cdot C_H \cdot P_y}{C_V + C_H \cdot P_y} \cdot EG \cdot v^2 \cdot \delta \qquad (7)$$

Figure 7:
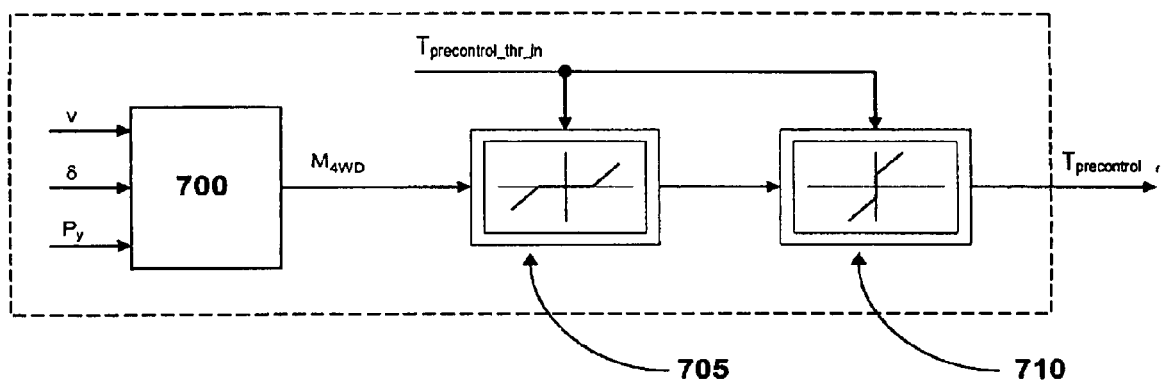
FIG. 7 shows a block diagram of a yawing moment precontrol unit.

The precontrol unit 420 which calculates the yawing moment $T_{precontrol}$ on the basis of such an inverse vehicle model is depicted in detail in FIG. 7 in a block diagram.

Depending on the input variables v, δ and $P_y$, the unit 700 calculates the yawing moment $M_{4WD}$ to be generated to achieve the yaw rate $\dot{\psi}_{ref}$, i.e., to achieve a neutral driving performance. The signal $M_{4WD}$ is then processed by blocks 705 and 710, whose output signal is the yawing moment $T_{precontrol}$ that is to be set by the precontrol unit.

The blocks then filter out the yawing moment requirements $M_{4WD}$ on the basis of characteristic lines, these yawing moment requirements being in a band around the zero point preselected by a threshold value $T_{precontrol,thr\_in}$. The threshold value $T_{precontrol,thr\_in}$ is preferably between 0 Nm and 200 Nm.

A hysteresis curve is preferably used as the basis here, thus yielding a signal $T_{precontrol}$ which is different from zero after the signal $M_{4WD}$ exceeds a first threshold value, e.g., $T_{precontrol,thr\_in}$ and the signal $M_{4WD}$ is faded out again after falling below a second threshold value, e.g., a percentage amount of $T_{precontrol,thr\_in}$.

This prevents a nervous driving performance from being established on the basis of minor adjustment requirements.

In addition to the precontrol unit 420, the inventive drive train regulator also contains the yawing moment regulator 410 which implements a feedback component of the drive train regulator.

Input variables of the yawing moment regulator 410 include the system deviation) $\dot{\psi}$ of the yaw rate $\dot{\psi}$, which is determined as the difference between the detected actual value $\dot{\psi}$ of the yaw rate and the calculated setpoint value $\dot{\psi}_{ref}$, the system deviation Δλ of the longitudinal slippage λ, which is determined as the difference between the calculated instantaneous longitudinal slippage λ and the setpoint $\lambda_{ref}$ and the system deviation Δα of the tire slip angle α which is determined as the difference between the calculated instantaneous tire slip angle α and the setpoint $\alpha_{ref}$.

Figure 8:
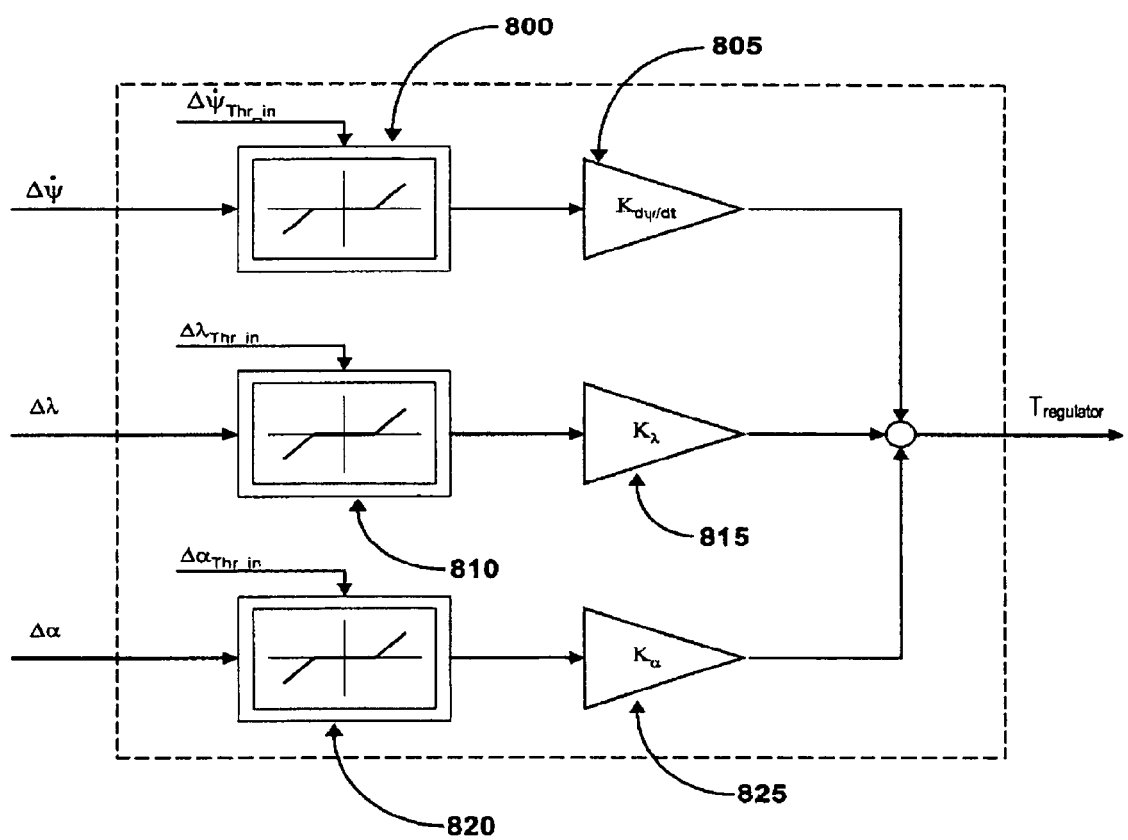
FIG. 8 shows a block diagram of a yawing moment regulator.

The regulation by the yawing moment regulator 410 thus consists of three separate branches, so that a combined regulation of important driving state variables is performed. FIG. 8 illustrates one possible embodiment of the regulator 410 on the basis of a block diagram.

The input variables $\Delta\dot{\psi}$, Δλ, and Δα are first compared with the threshold value by blocks 800, 810 and 820, whereby the blocks are preferably implemented as dead zone elements. The following proportional elements 805, 815 and 825 thus calculate a proportional value, which is different from zero, of the manipulated variable $T_{regulator}$ only when the system deviation $\Delta\dot{\psi}$, Δλ and Δα each exceed a threshold value. The dead zone elements thus in turn serve as a calming influence on the manipulated variable $T_{regulator}$.

The threshold value $\Delta\dot{\psi}_{thr\_in}$ is preselected at a value between 0 and 10°/s, preferably 3°/s. The threshold value $\Delta\lambda_{thr\_in}$ is between 5 km/h and 30 km/h, preferably 15 km/h. The threshold value $\Delta\alpha_{thr\_in}$ is between 0 and 10° C., preferably 5° C.

A yawing moment is calculated by proportional elements 805, 815 and 825 from each of the input variables. The proportional element 805 calculates a yawing moment $T=K\cdot\Delta\dot{\psi}$, the proportional element 815 calculates a yawing moment $T_\lambda=K_\lambda\cdot\Delta\lambda$ and the proportional element 825 calculates a yawing moment $T_\alpha=K_\alpha\cdot\Delta\alpha$.

The yawing moment $T_{regulator}$ compensating for the system deviation $\Delta\dot{\psi}$ is determined in the following form in a subtraction unit $$T_{regulator}=T-T_\lambda-T_\alpha.$$

The regulator gains K, $K_\lambda$ and $K_\alpha$ are suitably preselected. In particular, a stable regulating performance should be obtained through a choice of the gains.

In other possible embodiments of the regulator 410, the proportional elements are replaced or supplemented by dynamic regulating elements. In these embodiments, the regulating stability is further increased.

The setpoint variable $\vec{T}_{req,clutch}$ transmitted to the unit 220 for calculation of the clutch torques $M_{clutch,1,setpoint}$ through $M_{clutch,N,setpoint}$ is obtained by addition of the yawing moment $T_{precontrol}$ determined by the precontrol unit 420 and the yawing moment $T_{regulator}$ determined by the yaw rate regulator 410 by a summation unit 425.

However, an additional activation logic unit 415 is provided according to this invention. This activation logic unit determines control signals $T_{regulator,on}$ or $T_{regulator,off}$ as well as $T_{precontrol,on}$ or $T_{precontrol,off}$ by which the signals $T_{regulator}$ and $T_{precontrol}$ are activated or suppressed.

Thus the signal $T_{regulator}$ is transmitted to the summation unit 425 when the logic unit 415 determines the output signal $T_{regulator,on}$. With output signal $T_{regulator,off}$ the signal $T_{regulator}$ is not transmitted to the summation unit 425. Similarly, the signal $T_{precontrol}$ is activated or suppressed.

Input variables for the activation logic unit include the system deviations $\Delta\dot{\psi}$, Δλ and Δα, the pedal position $F_{ped}$ of the accelerator pedal and the degree of utilization $\alpha_{util}$ of the tire slip angle.

Figure 9:
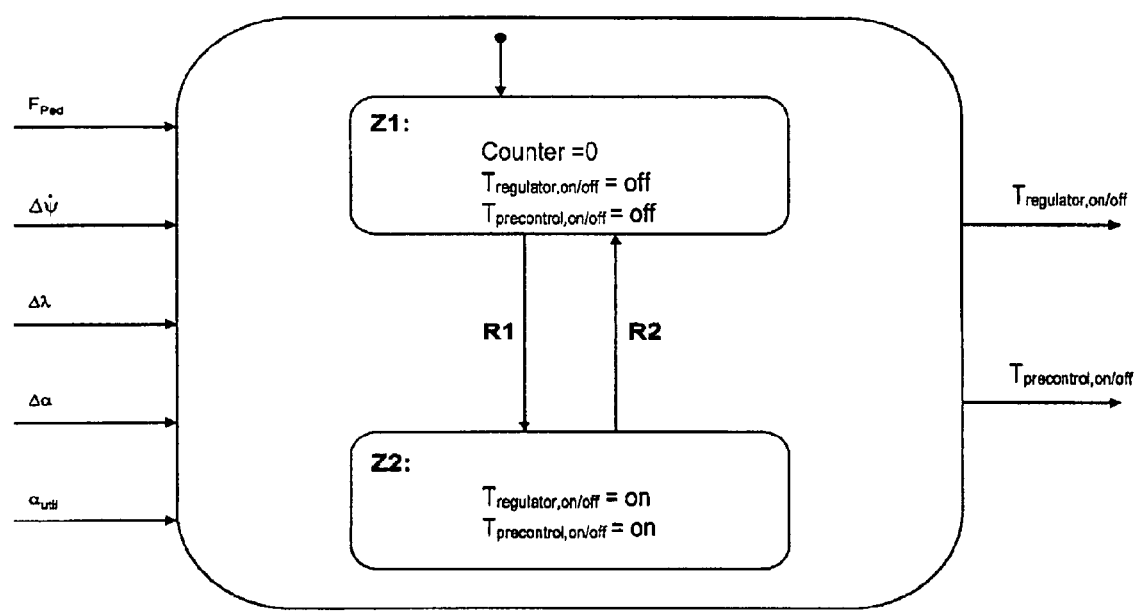
FIG. 9 shows a block diagram of an activation logic unit.

The function of the logic unit 415 is illustrated in FIG. 9 on the basis of a state transition diagram. It is assumed here that a first state Z1 and a second state Z2 can be assumed.

In the state Z1, the output variables assume the values $T_{regulator,off}$ and $T_{precontrol,off}$. In the state Z2 the output variables assume the values $T_{regulator,off}$ and $T_{precontrol,off}$ [sic].

The logic unit 415 also has a counter which is set at the value 0 in the state Z1.

A transition from the state Z1 to the state Z2 takes place on the basis of a rule R1, which can be formulated as pseudocode as follows:

| If | ( | $|\Delta\dot{\psi}| > \Delta\dot{\psi}_{thr\_in}$ |
|---|---|---|
|  | or | $|\Delta\lambda| > \Delta\lambda_{thr\_in}$ |
|  | or | $|\Delta\alpha| > \Delta\alpha_{thr\_in}$ |
|  | or | $\alpha_{util} > \alpha_{util,thr\_in}$ |
|  | ) |  |
|  | and | $F_{ped} > F_{ped,thr\_in}$ |
| then go to state Z2. | | |

A transition from the state Z2 to the state Z1 takes place on the basis of rule R2, which can be given as follows:

| If | $\alpha_{util} < \alpha_{util,thr\_out}$ |
|---|---|
|  | If counter = counter$_{thr}$ |
|  | then go to state Z1. |
|  | Otherwise increment the counter. |
| Otherwise, if | $F_{ped} \leq F_{ped,thr\_out}$ |
|  | and $\Delta\dot{\psi} > 0$ |
|  | then go to state Z1. |

The threshold value $\alpha_{util,thr\_in}$ is between 0.3 and 1, preferably 0.7.

The threshold value $\alpha_{util,thr\_out}$ is between 0.1 and 0.5, preferably 0.3.

The threshold value $F_{ped,thr\_in}$ is between 0 and 20%, preferably 4%.

The threshold value $F_{ped,thr\_out}$ is between 0 and 10%, preferably 0.

On basis of rule R1, the occurrence of a safety-critical driving state is recognized; on the basis of rule R2, the system determines whether the safety-critical driving situation has been overcome. Furthermore on the basis of the accelerator pedal position, a check is performed to determine whether an inventive regulating intervention can be performed.

The inclusion of rules R1 and R2 is checked again once in each scanning cycle. The threshold value counter$_{thr}$ is selected as a function of the duration of a scanning cycle, so that the condition counter=counter$_{thr}$ is satisfied with ongoing incrementing in each scanning cycle after a period of time between 0 and 300 ms, preferably after 200 ms.

According to the rule R1, an inventive regulating function is thus activated either when the absolute value of the system deviation $\Delta\dot{\psi}$ of the yaw rate $\dot{\psi}$, the absolute value of the system deviation $\Delta\lambda$ of the longitudinal slippage $\lambda$, the absolute value of the system deviation $\Delta\alpha$ of the tire slip angle $\alpha$ or the degree of utilization $\alpha_{util}$ of the tire slip angle exceeds a preselected threshold value and when the vehicle is adequately accelerated, which is recognized on the basis of the position $F_{ped}$ of the vehicle pedal.

According to rule R2, a control intervention measure is terminated when the degree of utilization $\alpha_{util}$ of the tire slip angle drops below the threshold value $\alpha_{util,thr\_out}$ and the counter has reached the threshold value counter$_{thr}$ or when the accelerator pedal position has dropped below the threshold value $F_{ped.thr\_out}$ and the system deviation $\Delta\dot{\psi}$ assumes a value of less than zero. In the latter case, the situation is similar to that represented in the table above by "accelerator pedal=0" and "$T_{precontrol} > 0$," in which a yaw rate regulating measure cannot be implemented on the basis of measures intervening in the drive train.

The reference notation S1 in FIG. 9 denotes a step according to which the state Z1 is assumed after an ignition restart.

Figure 10:
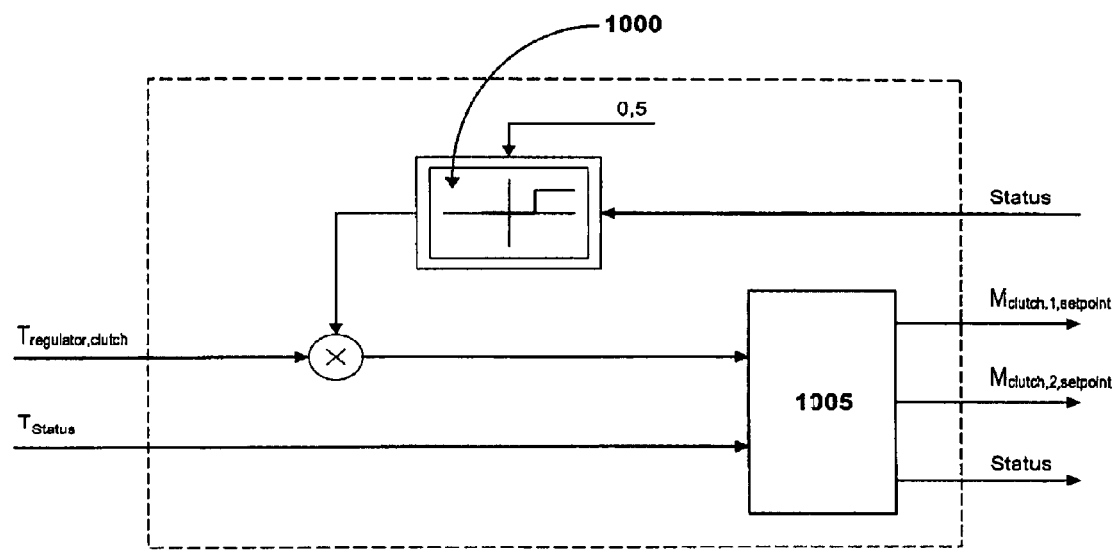
FIG. 10 shows a block diagram of a drive train regulator.

FIG. 10 shows a block diagram of the drive train regulator 230. Input variables of the regulator include the required yawing moment $T_{req,clutch}$ and the signal $T_{status}$ as well as another status signal "status," which is based on the status of the drive train control function.

The signal $T_{status}$ may assume the values "on" and "off" and is obtained in block 430 by a logic linking of the signals $T_{regulator,on/off}$ and $T_{precontrol/on/off}$. It assumes the value "off" only when $T_{regulator,off}$ and $T_{precontrol,off}$ values are obtained for these signals.

The additional status signal assumes the value 1 when an error detection function of the drive train regulator 220 has not detected an error. If an error has been detected, the status signal assumes a value of 0.

The status signal is processed first by the block 1000 within the drive train regulator. The output signal of the block 1000 assumes a value of one when the status signal assumes a value greater than 0.5 and otherwise has a value of zero.

A multiplicative linkage of the status signal process by the block 1000 and the signal $T_{req,clutch}$ implements an advantageous failsafe function so that regulating intervention measures are suppressed when an error is detected within the control unit or the actuators that control the clutches or in the clutches themselves.

The multiplied signal $T_{req,clutch}$ and the signal $T_{status}$ are transmitted to a unit 1005 which calculates torques to be transmitted by individual clutches. The calculation is performed in such a way that the yawing moment $T_{req,clutch}$ is generated by controlling the clutches according to the calculated torques.

The control of the clutches is performed by the unit 230.

In summary, it can be concluded that the present invention makes available an advantageous method and an advantageous device which make it possible to implement driving dynamics regulating measures on the basis of intervening measures involving the drive train of a motor vehicle. The invention is characterized mainly in that the driving performance of the vehicle is stabilized in the driving dynamics limit range and thus is made safer and more reliable.

The inventive regulating intervention measures are thus an effective and appropriate supplement to the regulating intervention measures by a traditional ESP system based on brake and engine intervention measures. They therefore not only increase the reliability and efficacy of an electronic stability program but also contribute toward driving comfort in the limit area because in contrast with the intervention measures with a traditional ESP system, the intervention measures according to the present invention are not associated with uncomfortable braking of the vehicle.

The threshold values which, when exceeded, result in implementation of the inventive regulating measure, should be lower than the threshold values of the ESP regulating system.

Likewise, the inventive regulating measures cannot replace ESP regulating measures in very critical driving situations. In a great many driving situations, however, they make them superfluous because they stabilize the vehicle before a very critical driving state occurs.

Figure 11A:
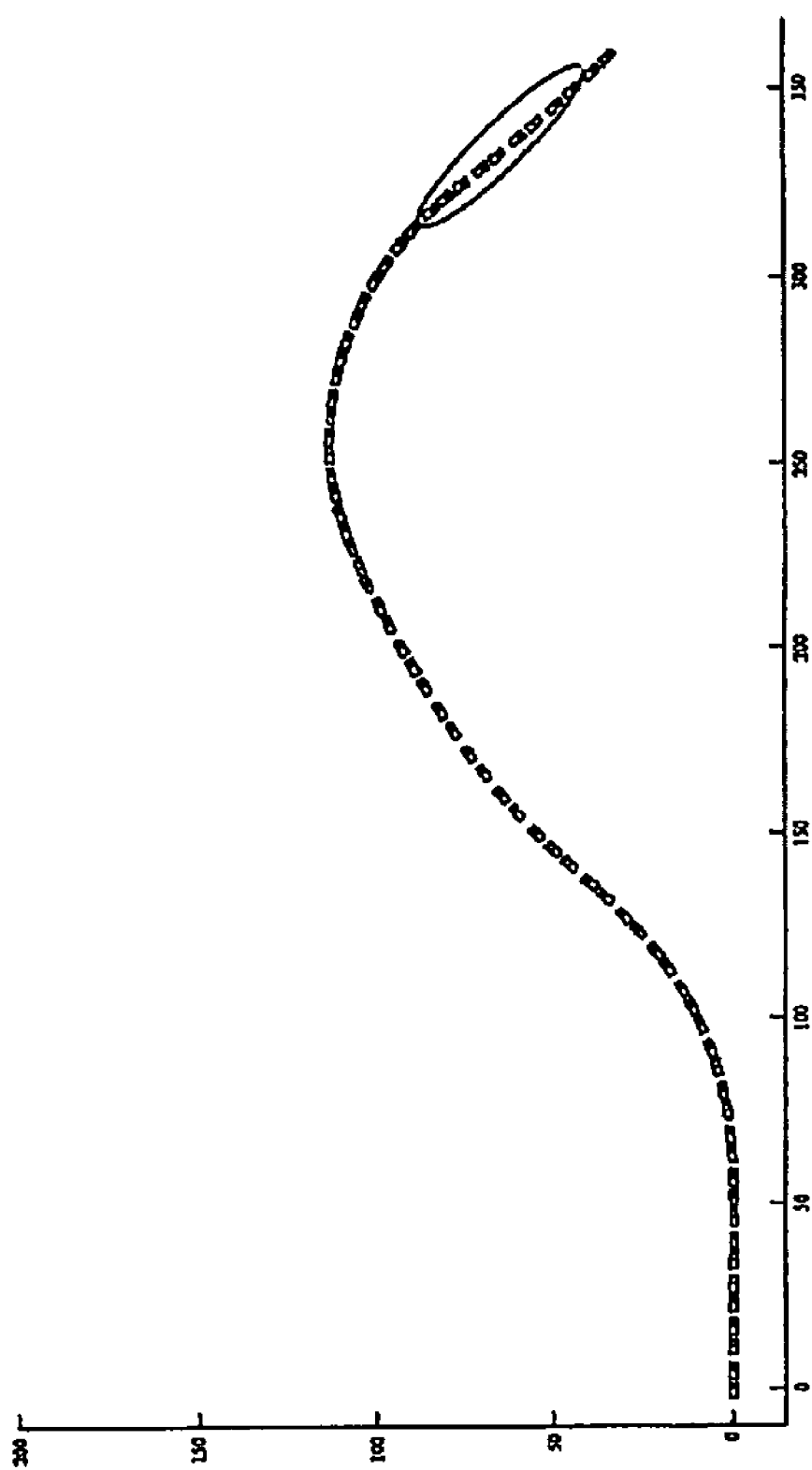
FIG. 11a shows an illustration of a driving maneuver.
Figure 11B:
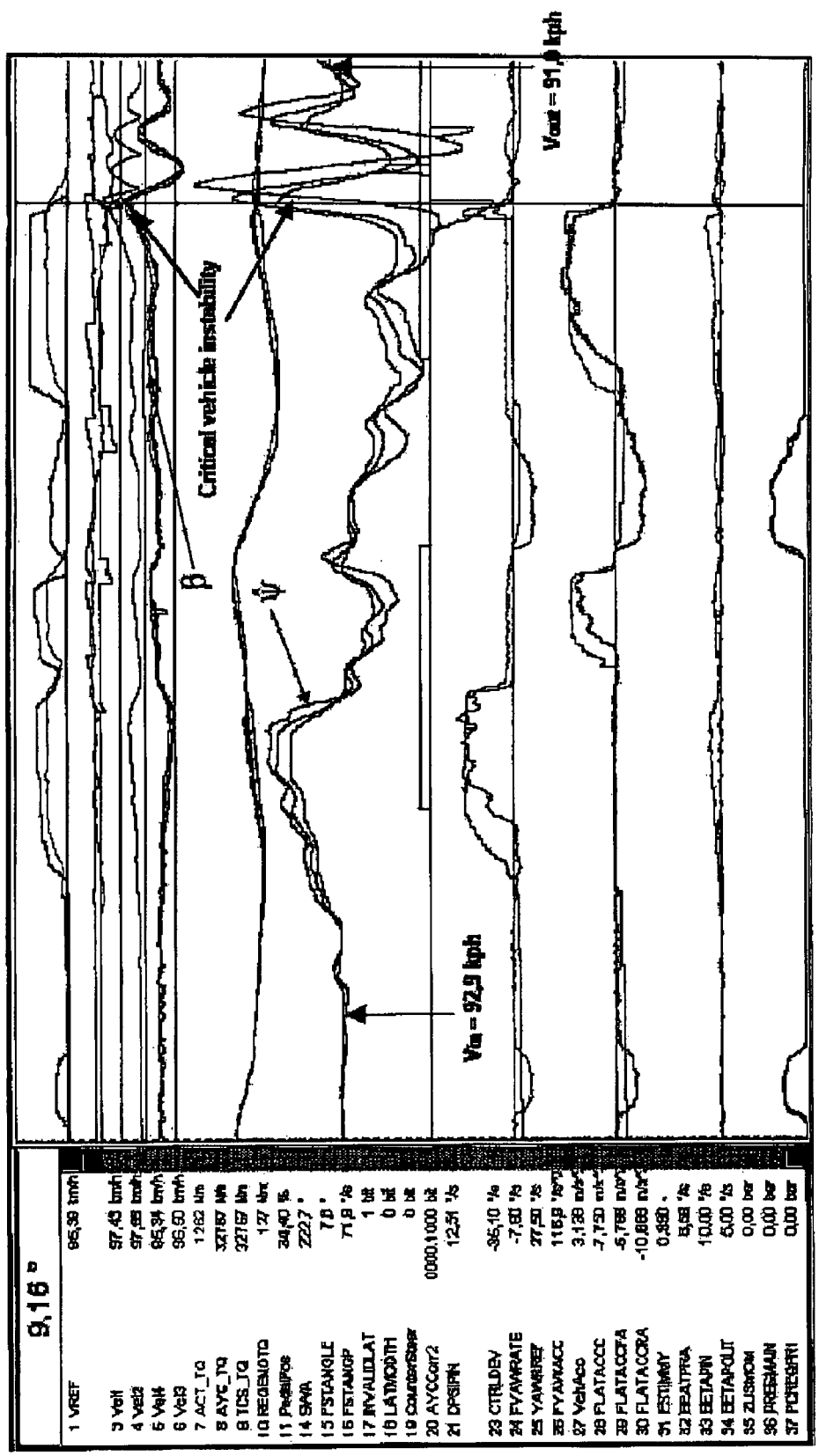
FIG. 11b shows diagrams with an analysis of the driving maneuver performed without the inventive control intervention measures.
Figure 11C:
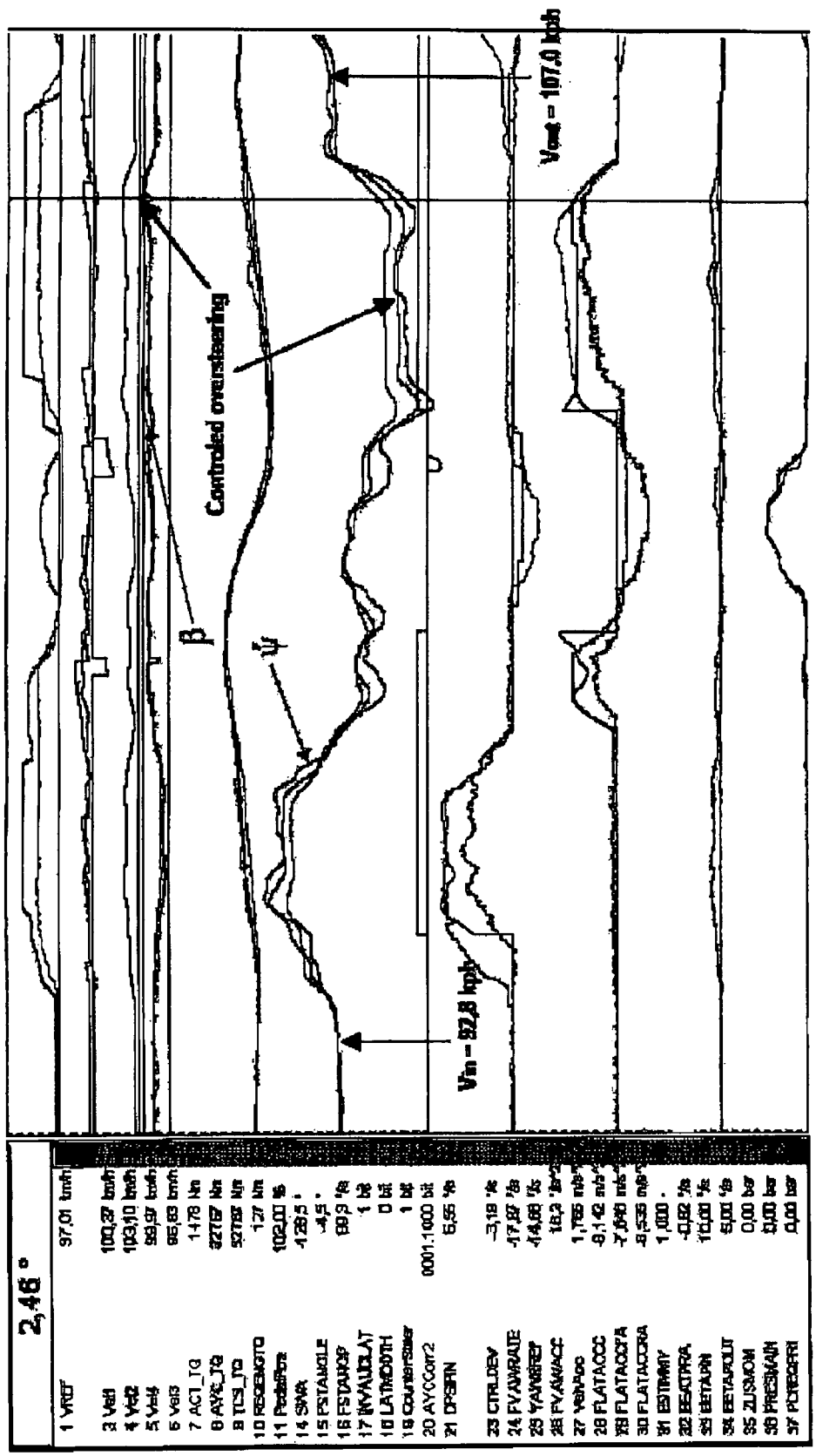
FIG. 11c shows diagrams with an analysis of the driving maneuver performed with the inventive control intervention measures.

The inventive improvements in efficacy of drive train regulation in comparison with known generic methods and devices can be seen by a comparison of the diagrams in FIGS. 11b and 11c. These diagrams show the plot of various variables during a driving maneuver illustrated in FIG. 11a in which first the vehicle turns left and then turns right with an initial speed of approx. 91.5 km/h. The vehicle was accelerated while turning.

The diagrams in FIG. 11b have been plotted for a vehicle in which the drive train is regulated without the features of the present invention.

The diagrams in FIG. 11c have been plotted for a vehicle of the same design in which an inventive drive train regulating system has been implemented.

These diagrams show in particular the plot of the yaw rate $\dot{\psi}$ and of the float angle $\beta$.

On the basis of these curves, FIG. 11b shows a critical instability of the vehicle with a very high yaw rate $\dot{\psi}$ and a critical increase in the float angle while turning right. The arrows shown in the diagram point to these elevated levels. The curve of the variables at this point illustrates floating and skidding of the vehicle.

In the diagram in FIG. 11a, the points in the curve where critical driving states occur have been shown with circles for the sake of illustration.

The curve of the yaw rate $\dot{\psi}$ and the float angle $\beta$ indicated by the diagram in FIG. 11c, however, illustrates only controlled oversteering of the vehicle at the same point in the right turn. The vehicle does not skid and no safety-critical float is observed.

This can be attributed to the inventive features whereby a precontrol is performed on the basis of a vehicle reference model determined as a function of the coefficient of friction and a combined regulation of important driving state parameters.

Since the inventive measures stabilize the vehicle very rapidly and there is no deceleration of the vehicle, the starting speed from the curve in driving through the curve at 107.0 km/h is much greater than when driving without the support of the features according to this invention. In this case the starting speed is only 91 km/h.

The invention claimed is:

1. A method for regulating driving dynamics of a motor vehicle with an electronic control unit functionally connected to a torque transmitter applying torque to at least one vehicle wheel, the method comprising the following steps:
    determining, in the electronic control unit, a value of an optimized wheel torque as a function of a first and second value of a yawing moment, wherein the first value of the yawing moment is determined as a value of the yawing moment that creates a setpoint value of a yaw rate on the basis of a vehicle reference model, and the second value of the yawing moment is determined as a function of a system deviation between the setpoint value of the yaw rate and a detected actual value of the yaw rate and as a function of the system deviation between a setpoint value and an actual value of an additional driving state variable other than the yaw rate; and
    applying, by means of the torque transmitter, the optimized wheel torque to at least one wheel of the vehicle,
    wherein the additional driving state variable is the slip angle of the at least one wheel.

2. The method according to claim 1, wherein the setpoint yaw rate is determined as a function of variables set by the driver.

3. The method according to claim 1, further comprising determining a coefficient of friction of an instantaneous substrate.

4. The method according to claim 1, wherein the coefficient of friction of an instantaneous substrate enters into the vehicle reference model.

5. The method according to claim 1, wherein another additional driving state variable is a longitudinal slippage of at least one wheel of the vehicle.

6. The method according to claim 1, wherein the wheel receives the torque only when a value of at least one driving state variable exceeds a predetermined first threshold value or does not fall below a second threshold value.

* * * * *

UNITED STATES PATENT AND TRADEMARK OFFICE
CERTIFICATE OF CORRECTION

PATENT NO.       : 8,204,669 B2
APPLICATION NO.  : 10/555902
DATED            : June 19, 2012
INVENTOR(S)      : Ulrich Lüders et al.

It is certified that error appears in the above-identified patent and that said Letters Patent is hereby corrected as shown below:

In column 16, claim 4, line 25, after "according to", replace "claim 1," with --claim 3,--.

Signed and Sealed this
Fourth Day of September, 2012

David J. Kappos
*Director of the United States Patent and Trademark Office*